UNITED STATES PATENT OFFICE.

ALBERT E. GREENE, OF CHICAGO, ILLINOIS, ASSIGNOR TO AMERICAN ELECTRIC SMELTING AND ENGINEERING COMPANY, OF ST. LOUIS, MISSOURI, A CORPORATION OF MISSOURI.

PROCESS OF MELTING SCRAP METAL.

1,185,394.  Specification of Letters Patent.  Patented May 30, 1916.

No Drawing.   Application filed January 23, 1911.   Serial No. 604,013.

*To all whom it may concern:*

Be it known that I, ALBERT E. GREENE, a citizen of the United States, residing at Chicago, in the county of Cook and State of Illinois, have invented a certain new and useful Improvement in Processes of Melting Scrap Metal, of which the following is a full, clear, concise, and exact description.

My invention relates to processes of electrically melting scrap metal and particularly steel scrap.

The object of my invention is to provide a method of melting scrap metal, and in particular steel scrap containing easily oxidizable elements, to produce a metal free from oxid and sound when poured, and to accomplish such results with a minimum loss of the metal constituents. One of the chief causes of wildness and blow-holes in steel is the presence of oxids of iron or manganese dissolved or combined with the molten metal, and these oxids are so readily absorbed by the metal from a slag or from exposure to oxidizing atmosphere, that very small amounts of oxygen serve to cause wildness. The longer the exposure to oxidizing conditions, the more costly the remedial treatment and the more uncertain will be the result when the oxids are not actually disposed of. I have discovered that soundness and deoxidation in steel when poured may be practically insured by means of special treatment of the metal during the melting process this treatment consisting primarily in providing a fluid slag and in subjection of this slag to specially controlled reducing action. The processes heretofore in use for the melting of such scrap provide no means, or else very inadequate means, for preventing oxidation or for insuring the removal of the dissolved oxids and causes of wildness of the metal during process of melting. The usual remedy for dissolved oxids is to add deoxidizing alloys like ferro-silicon and ferro-manganese at the time of tapping the heat so that there will be as little time as possible for the absorption again of more oxids from the slag. Such treatment is necessarily uncertain both as to the amount of deoxidation and as to the amount of alloyed metal left to meet the specifications. One method suggested is the use of a slag to minimize the effect of an oxidizing atmosphere on the steel; but a slag is an excellent carrier of oxygen from atmosphere above to metal beneath and it has not been claimed that a slag will prevent loss of valuable metal by oxidation. Another means suggested is the use of a closed furnace having a neutral atmosphere which will be beneficial to the metal; but this means is impracticable and inadequate. If no oxygen entered the furnace on the scrap charged or through the openings into the furnace this suggestion would be more plausible; but the entrance into the furnace of oxid on the scrap is one of the working conditions which my present invention is designed to meet. Oxygen is invariably present on scrap charged and oxygen enters with the scrap at the time of charging. Under these conditions if the furnace is closed, absolutely, and the melting caused to proced, the atmosphere which would result would be "neutral" and likewise the slag but oxid of iron would be present and would be taken up by the molten metal under these so-called neutral conditions and losses of metal and time and energy would occur which it is the object of my present invention to avoid. The oxid which enters on the scrap will alone rapidly form an oxidizing slag and in actual practice the closing of the furnace and allowing the conditions to become neutral, even if indefinitely prolonged, will not cause reduction of the oxids so as to avoid the necessity of finally deoxidizing the steel. It is to be noted further that the entrance of cold air into the furnace is especially objectionable for the reason that the entering air, being cold, displaces the hot gases above the bath and the air spreads out over the charge so that fresh oxygen is carried to the metal either directly, in case the metal surface is exposed, or else through the slag as a carrier. It should be remembered that carbon monoxid, a reducing gas, may be formed as a product of the reaction between oxid of iron in the slag and carbon in the metal, but the existence of this reaction does not deoxidize the steel nor does the reaction product, carbon monoxid, because the reaction does not complete itself; and the carbon monoxid formed tends to rise toward the roof of the furnace chamber particularly if cold air from outside the furnace enters. It is quite common to see small flames of gas shooting up from the slag in a furnace when oxidation of the carbon in the metal is taking place and the burning of this gas in the atmosphere next above the slag is partial evidence of the presence of sufficient oxygen to support combustion. Further evidence of the nature of the atmosphere in electric furnaces of the arc type may be had when it is remembered that usually from 5 to 10 pounds of carbon is burned in the atmosphere of the furnace per ton of steel melted, and that in the processes as heretofore practised deoxidizing alloys are practically invariably employed.

The above are the conditions which it is the object of my present invention to correct and avoid; and unless the oxids in the slag are reduced by an added reducing agent and the slag kept in reduced condition so as to prevent absorption of oxygen by the metal all as provided for in my present invention, then it will be necessary to resort to some remedial course with material loss in metal, time and energy.

The details of slag composition and treatment contemplated by my process will be described later.

If the scrap be melted in an open hearth furnace, the oxid commonly present on the surface of the scrap forms a slag which reacts with the metal and oxidizes the more readily oxidizable metals. In certain cases this oxidation has been taken advantage of for removing such impurities as phosphorus, namely in the basic open hearth process, but the loss of the alloy constituents is exaggerated by such procedure. These slags in the open hearth process take up especially the silicon and the manganese, so that additions of these elements have to be made at the end of the heat. Even in the electric furnace, if a charge of steel scrap be melted, the oxids collect as a slag and ordinarily cause a great loss of such alloy metals as manganese and silicon. My invention is designed to prevent this loss and to avoid the injurious effects of dissolved oxids resulting from the ordinary process of melting.

Thus a primary feature of my invention is the means of prevention of injurious effects during the melting of steel scrap rather than a means of remedying ill effects after they have occurred.

My invention contemplates a process of melting scrap metal in an electric furnace and preventing excessive loss of metal from oxidation by the use of a slag from which the ingredients of the metal are kept reduced and by which oxidation of the metal is prevented by the action of a reducing agent to which the slag is subjected.

My invention further contemplates the use of a slag during the melting such as will most readily aid in the saving and deoxidizing of the metal; thus in the melting of the metal of basic nature, such as manganese steel, in a basic lined furnace, the slag is made essentially of lime with a suitable amount of silica to give it the desired fluidity; and in the melting of a metal of essentially acid nature which may be carried out in acid lined furnace the essential constituent of the slag may be silica.

In melting ordinary steel scrap containing, for example, .70% manganese and .35% silicon in the usual manner either in an electric furnace or in an open hearth furnace, the manganese and the silicon are practically entirely oxidized out of the metal. My present invention enables one to melt steel scrap and keep a given alloy ingredient at practically the same percentage.

In melting nickel steel scrap or nickel-chrome steel scrap, as for example, armor plate scrap, by the usual processes, there is a strong tendency to produce metal which contains oxids and which, when poured, is wild and will have blow holes in the castings. even though a considerable amount of the nickel and possibly some of the chromium may be retained during the melting. I attribute this tendency toward wildness to the oxids absorbed by the metal during melting, and I find that by using the process of this invention a metal is produced which is not wild, which does not have blow holes, and furthermore which has not sustained a great loss of its constituent metals during melting.

I will now describe my invention in several of its applications, and will consider first the melting of ordinary steel scrap containing, for example, carbon .25%, silicon .35% and manganese .70%. For melting this grade of scrap I preferably use a basic lined electric furnace, and either melt a small amount of steel therein or else charge a small amount of molten steel into the furnace. I then melt a slag on top of the metal, as for example a lime-silica slag. Lime may be charged right at the start of melting or after a bath has formed. The necessary fluidity is obtained by combining with the basic oxid, lime, an oxid of acid nature like silica and this acid oxid may be provided in any suitable manner. Where foundry scrap is remelted the sand adhering to the scrap may be allowed to enter with the scrap and will aid in making a fluid slag. Fluidity of the slag in my present invention is important since then the slag readily covers the whole bath of molten metal and makes possible quick reducing action on the oxids that collect in the slag. A fluid slag also serves to keep a solid carbonaceous reducing agent from contact with the steel and therefore to prevent recarburizing of the metal, but it is necessary to provide the reducing agent in reasonably fine condition so that chunks do not dip through the slag into the steel. A slag consisting almost entirely of lime requires considerable time and power to melt it when free from oxid of iron and the like and such a slag, by reason of its viscous nature is difficult to remove from the furnace. It has been customary, heretofore to rake such a slag out of the furnace. However, by the provision of silica in combination with the lime as in my present invention ample fluidity can be insured and the slag may be poured through a small tap hole from the furnace along with the steel. In practising my present invention it is preferable to provide a slag that will be fluid enough to keep the molten metal covered so that upon addition of scrap the surface of the metal bath will not be left exposed. I then begin to charge the steel scrap, preferably without taking the power off the furnace, and at intervals I throw fine coke on top of the slag either alone or mixed with some of the slag making material. This reducing agent reduces the oxids of the metals in the scrap and also prevents their further formation. During the melting of the scrap, fine coke or other form of reducing agent is further added, as conditions require, to keep the slag reduced. In this way the silicon and the manganese and the iron may be practically prevented from oxidation, and as a result the usual melting loss may be practically avoided and the final additions, commonly made, greatly diminished in quantity.

When the slag is reduced so as to be practically free from oxid of iron the steel is then in deoxidized condition and is ready to pour as soon as the temperature is properly regulated. The amount of coke or other fine carbonaceous reducing agent necessary to bring the slag to the reduced condition is dependent on how much oxids enter with the charge and have to be reduced, but inasmuch as the slag will, when properly made, prevent the fine reducing agent from carburizing the metal sufficient coke may be added so that it remains on the surface of the slag after the oxids of the scrap or of metals desired reduced have been reduced. The color of the slag will give some idea of how far reduction has proceeded; and when the oxids of iron and manganese are largely reduced out of the slag its color will be a light green or gray or brown. The oxids which enter with the scrap require time to collect in the slag and to be reduced. The fluid slag provided for collects these oxids rapidly and enables the reducing agent to act rapidly on them. When part of a charge has been melted and more is charged the fluid slag keeps the melted metal covered. If the whole surface of the bath is covered by the added scrap a little time is required to melt the scrap into the bath before adding coke or other reducing agent to the slag. By making the additions of coke a little time before melting of the scrap is complete the reduction of the slag may be completed by the time the metal is all raised to pouring temperature, and thus avoid delays in deoxidizing at the end of the process.

The composition of the lime-silica slag adjusts itself more or less automatically and thus, in a basic lined furnace, the slag may take up magnesia and alumina from the furnace lining to increase the ratio of basic ingredients; and the reduction of silica from the slag by means of coke may lessen the amount of silica in a slag. It is desirable to control the proportions of basic and acid ingredients in the slag so as not to undesirably wear the lining. An essential difference between my present invention and the commonly practised electric furnace processes is that in the latter oxids of manganese and iron are especially relied upon to provide fluidity of slag.

Another feature of my invention is that calcium carbid is not so likely to form and the slag is consequently easier to work.

The ability to retain the metals reduced makes it possible to pour off a portion of a heat and then proceed with melting again without having to lose the alloyed ingredients of the steel and to replace them. In other processes it is customary to rake off the oxidizing slag and when this is done much valuable alloy metal is lost in the condition of oxid. I have also found that by adding scrap and reducing agent at intervals the melting of the scrap and the reduction of the slag are facilitated because the metal added in smaller quantities comes in better contact with the slag and is more quickly acted on.

Instead of using coke or other solid form of carbon as a reducing agent, I may use a reducing gas such as producer gas, and I have found that such gas will readily and rapidly reduce the oxids out of the slag.

Another application of my process is to the melting up of silicon steel scrap. I prefer, when melting scrap containing much of acid elements like silicon, tungsten, etc., to use an acid lined furnace. The furnace may be started as described above for melting ordinary scrap. The slag is then provided and preferably contains more than 65% silica. The other component of the slag may consist of lime or any other oxid or oxids of basic nature with respect to silica which will form a fluid slag with the silica under the reducing conditions maintained, but not basic oxids like iron or manganese which it is desired to reduce. The object of providing an oxid of opposite nature to the silica is two fold: first to produce fluidity; and second, to satisfy the affinity of silica for a basic oxid so that the oxids of the metals in the steel may be easily reduced from the fluid slag. It is easier to reduce iron or manganese oxids held or dissolved in a silicate slag in which the affinity of silica is largely satisfied by a basic oxid other than of iron or manganese than it would be to reduce an iron silicate or a manganese silicate in the absence of some other oxid having affinity for the silica. Sand may be used to make slag and if impure sand is used it is likely to contain oxids which will make it easily fusible, such as clay. After the slag is formed fine coke or other reducing agent is thrown on the slag and the oxids of iron and the metals desired reduced are reduced. During the melting of the remainder of the scrap metal reducing agent may be added at intervals and at any rate after the last charge of scrap has been made. The action of the reducing agent may be carried on until silica is reduced to metallic silicon which latter enters the metal. This action gives insurance of deoxidized metal. The composition of the slag is kept approximately uniform more or less automatically. Although an acid lined furnace is preferred a furnace lined with any kind of material sufficiently refractory and such as will not undesirably carburize the metal may be used. When the affinities of the acidic and basic oxids in the slag are more or less satisfied by each other, the reduction of the metallic oxids like those of iron and manganese is simplified and the action on the refractory lining is not detrimental.

An important feature of my invention is the use of a slag made essentially of lime and silica to give low melting point, fluid slag from which the reduction of metallic oxid and in certain cases of the silica is accomplished by the reducing action of the added reducing agent. The silicon reduced from such slags enters the metal. The strong reducing action and the helpful fluidity are very important means of thoroughly deoxidizing and purifying the steel. This feature applies in either acid or basic lined furnaces and to slags in which the main ingredient may be either acid, like silica in combination with a basic ingredient like lime; or to slags in which the main ingredient is lime with silica to give the desired fluidity.

In melting nickel steel scrap or nickel-chrome steel scrap by this process, I prefer to employ an acid lined furnace, though a basic lined furnace may be employed. The process as applied to such scrap is the same as that described above for ordinary steel scrap.

I will now describe the application of the process to the manufacture of tool steel by combining ordinary steel with tungsten-chrome steel scrap. I first provide a bath of molten steel in an acid lined electric furnace, and the amount of this steel may be only a small portion of the total charge the furnace is to hold after the melting in of the scrap. This initial charge may contain, by analysis: carbon .15%, silicon .30%. I then provide the charge with an acid slag containing about 80% silica and a small amount of lime, to produce suitable fluidity in the slag. The tungsten-chrome steel scrap is then charged into the bath while the electric power is kept on, and during the melting I keep the oxids reduced out of the slag as described above. After melting all the scrap I prefer to make the final additions to bring the bath to the required composition, that is, to make up for the lack of alloy metals in the initial charge of steel and at this time I prefer to regulate the carbon in the steel by means of the tungsten or other alloy additions. My invention serves to conserve these additions.

As explained above it is usually advantageous to use a furnace whose lining is of similar nature to the oxid of a particular metal to be reduced from the slag; thus in getting silicon into steel during melting and retaining it in the steel, a furnace lined with silicious material and a slag in which silica is an essential ingredient are desirable. And in melting scrap containing manganese it is desirable to have a slag in which the essential oxid is basic like lime. But in any case the affinity of the slag oxids for oxids of the metal or metals melted is limited by providing an oxid in the slag to satisfy such affinity; thus in melting scrap containing manganese under a slag made basic with lime but containing silica, silicon can be retained in the metal as well as manganese and can be reduced from the slag. I may, however, where desired aim to retain in the steel melted a single alloying metal like manganese and then add silicon in the form of some alloy at the end of the melting process after the oxid of iron has been reduced from the slag; or I may retain silicon or some other alloying metal and add others at the end of the process. The process is applicable to the melting of any grade of scrap iron irrespective of its carbon content and the process is not limited to that group of iron alloys ordinarily known as steel.

The process of this invention is applicable to the usual types of electric melting furnaces, including electric cupula furnaces, it being essential to maintain the slag reduced through which the scrap or melted metal passes.

It is to be understood that my invention is applicable to the melting of such metals as aluminum, copper, and metals in general, subject to injurious oxidation or change of composition during melting.

The advantages of my present invention may be briefly summarized thus:—A slag is provided which is fluid and from which oxids of metals desired in the reduced metal may be easily reduced; deoxidation of steel is insured in a way heretofore not known; control of the alloying elements and metals in steel is made possible in a simple and efficient manner; loss of alloying metals by oxidation is minimized and practically eliminated; a slag is made possible which has little wearing effect on the lining of the furnace and yet which can be readily poured from the furnace instead of having to be raked out as is the case with the processes as practised heretofore; the use of a low-melting point slag saves power in melting, time in reducing the oxids and readily collects the oxids so that they may be reduced making possible the deoxidation of the steel practically as soon as melted when desired. I am aware that it has been proposed to save such metals as manganese in what is known as manganese steel scrap by superheating steel and adding the scrap thereto so as to lose as little manganese as possible from oxidation by minimizing the length of the process, but my process presents a means of actually saving practically all the manganese in a much more simple and efficient manner and one applicable to saving small amounts.

I am aware that in United States Letters Patent No. 954,185 issued April 5th, 1910, to Henry D. Hibbard, a process is disclosed in which the scrap is melted in a "non-oxidizing" atmosphere and the melted metal is protected from oxidation by a "non-oxidizing slag." I have found in practice that the melting of the scrap forms an oxid slag which causes a loss of metal, and that to prevent this loss some strong reducing agent must be applied. The specification of the above-mentioned patent states that the non-oxidized atmosphere results from the fact that the heat is supplied electrically and air is excluded, no other means for producing the "non-oxidizing atmosphere" being disclosed. I have found that such procedure will not produce the results I have obtained, and particular attention is directed to the fact that it is the maintaining of the slag reduced and not the use of a non-oxidizing slag which is the essential feature of my process.

It is understood that by the terms "manganese containing steel," "manganese steel," and "silicon steel," I mean steels containing these alloys in any proportion.

I claim:—

1. The process of making steel which consists in charging steel scrap into a slag-covered bath in an electric furnace, the slag comprising a basic oxid in combination with an acid oxid in suitable proportions to form a fluid slag in the absence of oxid of iron and that oxid being in excess which is of similar nature, basic or acid, to the nature of the refractory lining of the furnace, and during the melting subjecting the slag to the action of an added carbonaceous reducing agent so as to prevent loss of an ingredient of the steel scrap, and continuing the reducing action until practically all of the oxid of iron held in the slag is reduced, leaving the steel in deoxidized condition.

2. The process of melting steel scrap in an electric furnace lined with a suitable refractory material, said process consisting in providing a slag which, when melted, and reduced, will contain an oxid or oxids of similar nature to the furnace lining and an oxid in less proportion of opposite nature to the lining but sufficient to give a fluid slag, and during the melting of scrap by electric heat, subjecting the slag to the action of an added reducing agent until the oxid of iron is practically all reduced out of the slag leaving the metal deoxidized and ready to pour after final regulation of the composition.

3. The process of making steel which consists in charging steel scrap into an electric furnace together with slag making materials containing a basic oxid like lime and an acid oxid like silica in suitable proportions to form a fluid slag when the steel is melted, the component of the slag which is of like nature to the lining of the furnace being in excess, and after bringing the charge to a suitable melting temperature allowing the oxids to collect in the slag and meantime subjecting the slag to the action of a reducing agent and reducing the oxids until the iron is practically all reduced leaving the steel in deoxidized condition.

4. The process of melting steel scrap and saving an alloyed metal contained in the scrap, the process consisting of adding the scrap to a bath covered with a fluid slag in an electric furnace, melting the scrap electrically, collecting in the fluid slag the oxids which enter with the scrap including oxids of the alloyed metal, subjecting the slag to the action of a reducing agent so as to prevent it from carrying air to the melted steel and continuing the reducing action on the slag until the slag is practically free from oxid of iron, leaving the steel in reduced condition and the alloyed metal therein.

5. The process of melting steel scrap containing manganese alloyed therewith, said process consisting in melting the scrap in an electric furnace, providing a slag containing a considerable proportion of lime and a small proportion of an acid oxid, acid with respect to lime, to give fluidity to the slag, melting the scrap in the bath covered with this slag, subjecting the slag to the action of a reducing agent, and continuing the reducing action until the oxid of manganese is practically all reduced from the slag and also the oxid of iron leaving the steel in essentially deoxidized condition and containing practically all the manganese which collects in the slag without undesirable carburizing of the steel.

6. The method of protecting steel from oxidation and from loss of an alloyed element contained therein, while melted in an electric furnace, the process consisting in maintaining a fluid slag covering over the steel comprising lime and silica in suitable proportion to give fluidity without undue corrosion of the furnace lining and meantime adding to the slag a carbonaceous reducing agent in fine form, and continuing the reducing action until the oxid of iron is practically all reduced.

7. The process of making steel from pure scrap materials suitably free from impurities not desired in the steel, the process consisting in providing an electric furnace with a refractory lining containing silica and of essentially acid nature, melting the scrap therein and providing a slag containing silica together with a basic oxid to give the slag fluidity, this basic oxid being of such nature as will not be reduced materially under the reducing treatment of the process, and meantime adding a reducing agent to the slag and continuing the treatment until the oxid of iron is practically all reduced from the slag and until silicon is reduced.

8. The method of melting scrap iron in an electric furnace having an acid lining, the process consisting of providing a slag containing silica and a small proportion of an oxid basic with respect to silica to give fluidity to the slag, this oxid being one which will not materially reduce under the action of a carbonaceous reducing agent, melting the scrap and keeping the bath covered with this slag and adding a carbonaceous reducing agent to the slag until oxid of iron is practically all reduced out of the slag and until silicon is reduced from the silica of the slag and incorporated in the metal.

9. The process of melting steel scrap and controlling the carbon content thereof which consists in providing in an electric furnace a slag comprising acid and basic oxids like silica and lime, the proportions being regulated to produce a fluid slag without undue wear on the lining, charging scrap and a carbonaceous reducing agent at intervals, reducing the oxid of iron from the slag so as to prevent it from oxidizing the carbon in the steel and maintaining the desired content of carbon in the steel without undesirable carburizing and continuing the reducing action on the slag until the oxid of iron is practically all reduced out of it, the other alloy constituents being regulated at the end of the process.

10. The process of melting steel which consists in providing a suitable electric furnace and a bath of molten steel therein under a fluid slag, the slag comprising basic and acid oxids like lime and silica in proportions to give fluidity without undue wear on the lining, charging scrap and carbonaceous reducing agent at intervals, reducing the oxids of metals that collect in the slag, and maintaining the composition constant with a minimum of alloy additions, final additions being made to incorporate elements not provided in the scrap and thus maintaining deoxidized steel on tap, almost continuously.

11. The method of treating steel in an electric furnace which consists in applying thereto a slag containing a basic oxid like lime in combination with an acid oxid like silica, the basic and acid components being in such proportion as to form a fluid slag at the temperature of the melted steel without undue wear on the furnace lining, and while maintaining the metal and slag heated to a melting temperature, subjecting the slag to the action of a reducing agent until the oxid of iron is practically all reduced from the slag and silicon from the slag caused to enter the steel and become incorporated therewith.

12. The method of treating steel in an electric furnace which consists in applying thereto a slag containing lime and silica in proportions to form a suitably fluid slag at the melting temperature of the steel without undue wear on the furnace lining, and while maintaining the metal and slag heated to the desired melting temperature, subjecting the slag to the action of a reducing agent until oxid of iron is reduced from the slag and silicon reduced from the silica of the slag.

In witness whereof I hereunto subscribe my name this twentieth day of January, A. D. 1911.

ALBERT E. GREENE.

Witnesses:
GEORGE E. FOLK,
GEO. C. DAVISON